Feb. 4, 1936.  C. MAJER  2,029,827
MACHINE FOR CONTINUOUSLY INSERTING BOTTOMS AND LIDS IN FINISHED
VESSEL WALLS OF PAPER, CARDBOARD AND THE LIKE
Filed Sept. 26, 1934  7 Sheets-Sheet 1
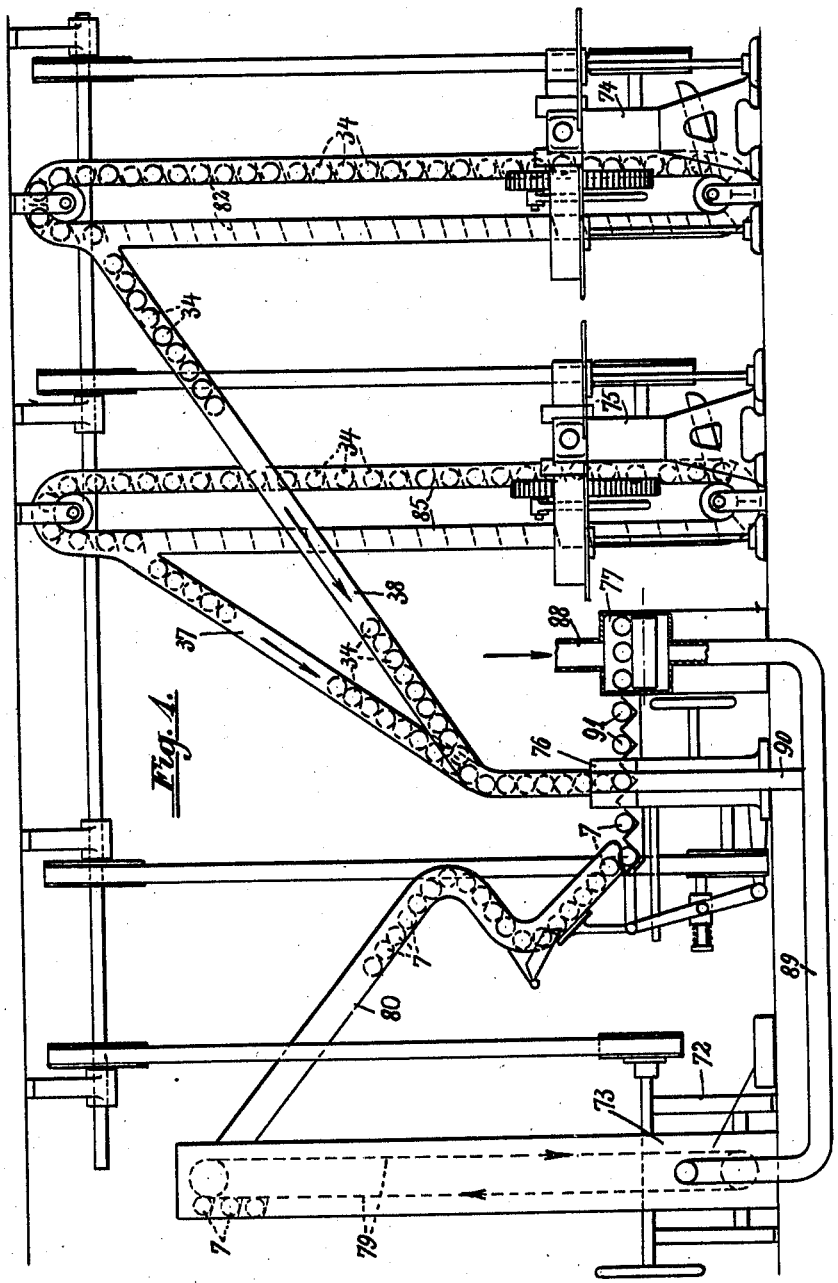

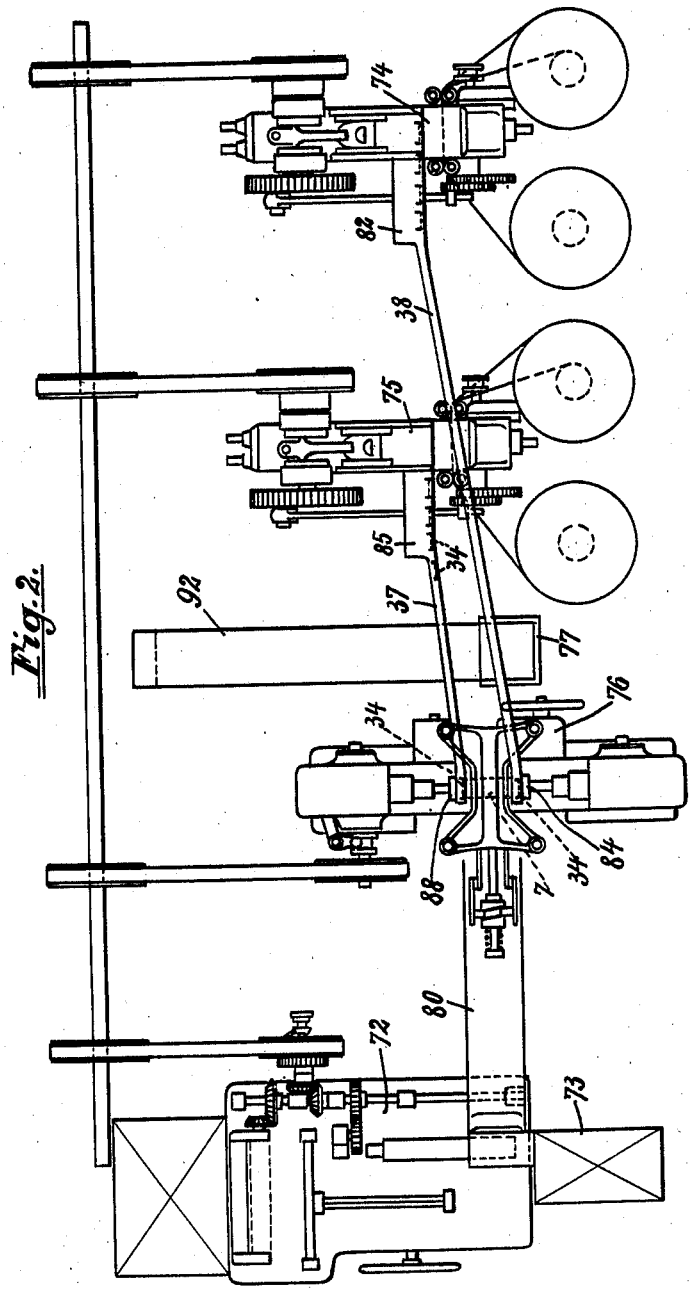

Feb. 4, 1936. C. MAJER 2,029,827
MACHINE FOR CONTINUOUSLY INSERTING BOTTOMS AND LIDS IN FINISHED
VESSEL WALLS OF PAPER, CARDBOARD AND THE LIKE
Filed Sept. 26, 1934 7 Sheets-Sheet 3
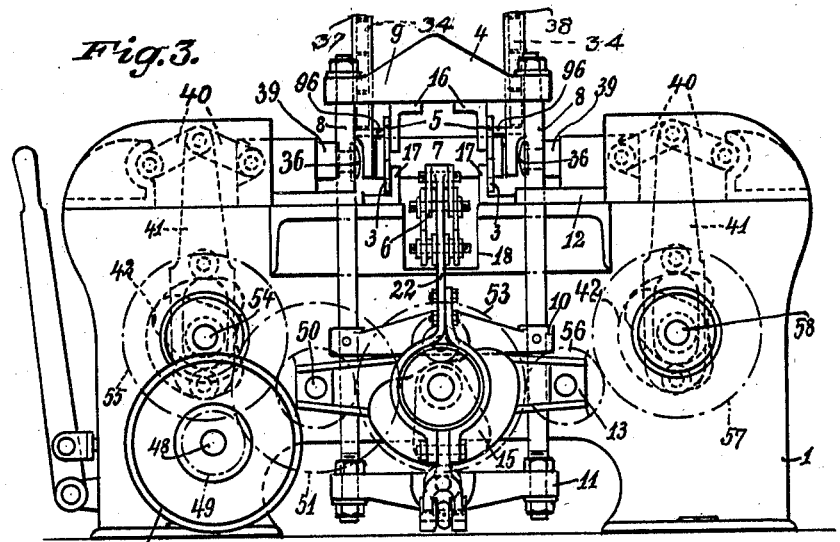
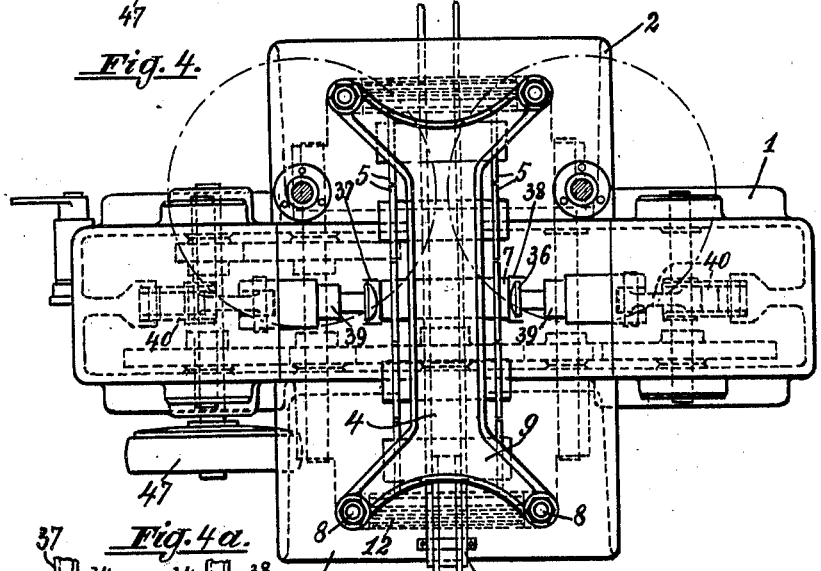
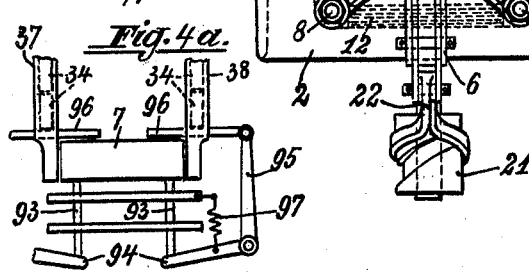

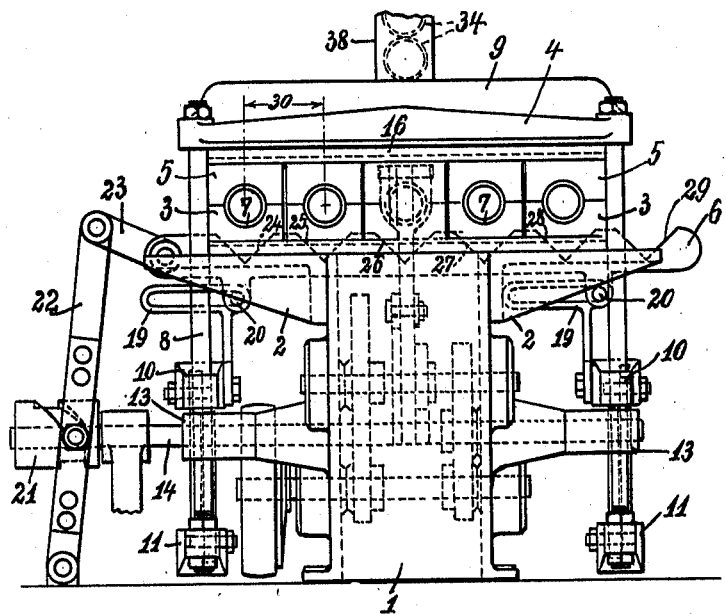
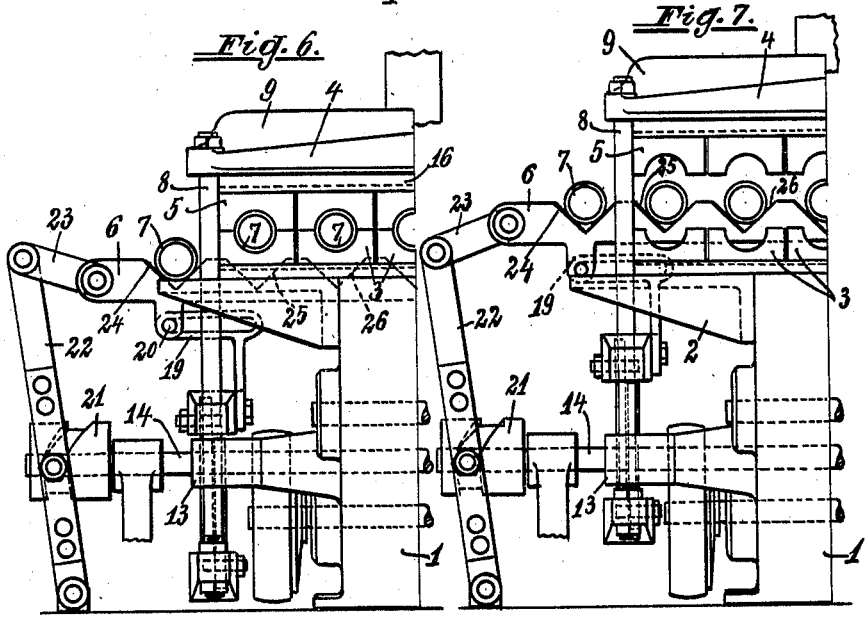

Feb. 4, 1936.    C. MAJER    2,029,827
MACHINE FOR CONTINUOUSLY INSERTING BOTTOMS AND LIDS IN FINISHED
VESSEL WALLS OF PAPER, CARDBOARD AND THE LIKE
Filed Sept. 26, 1934    7 Sheets-Sheet 5
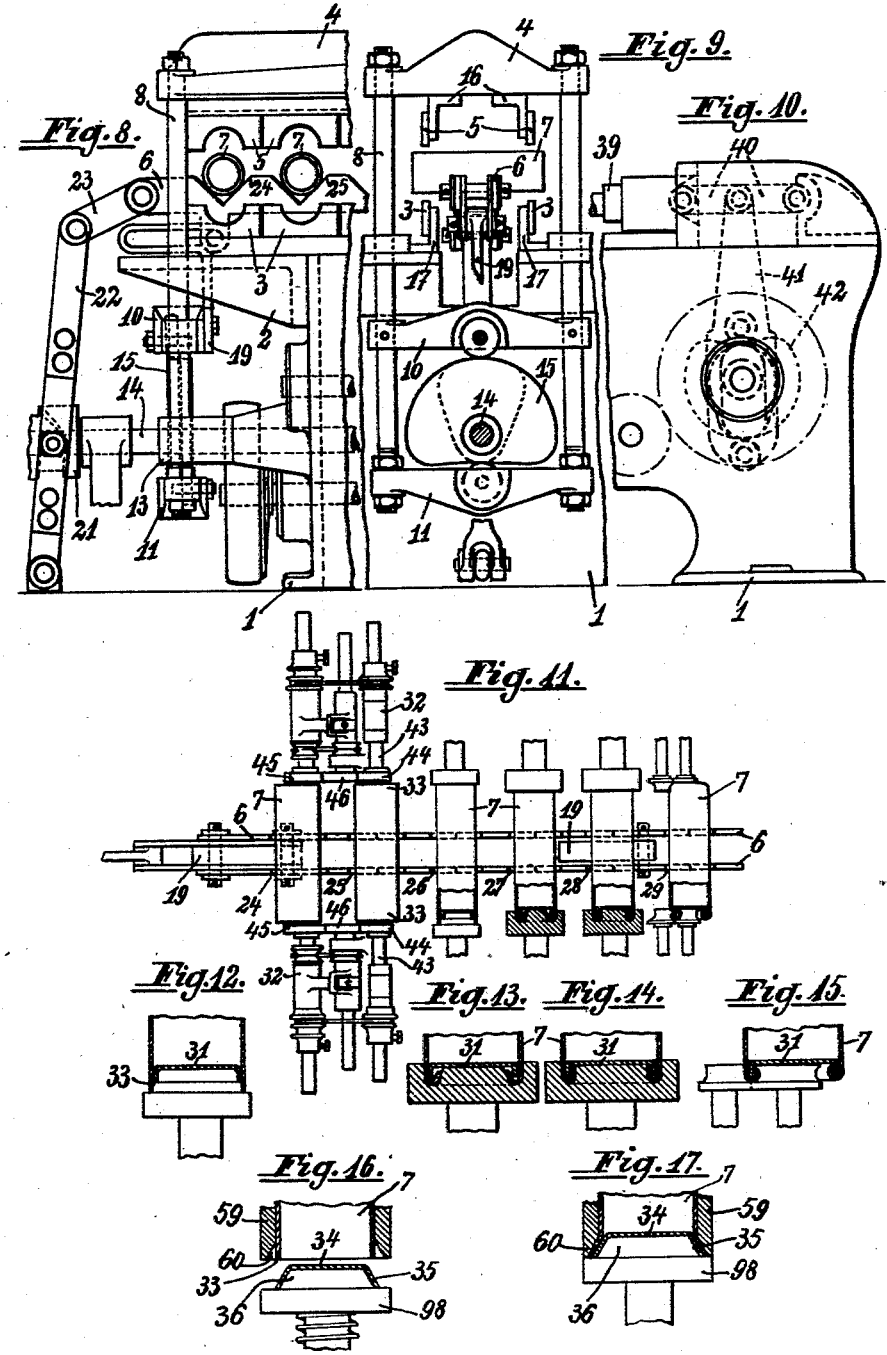

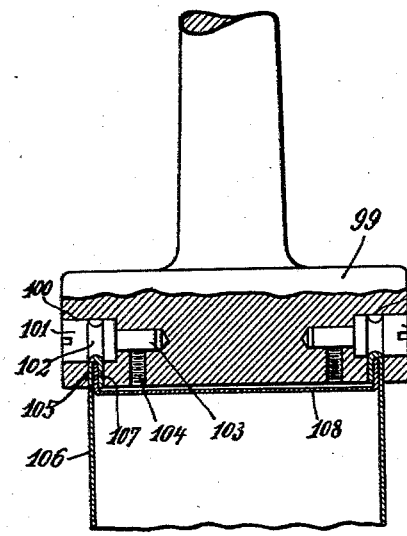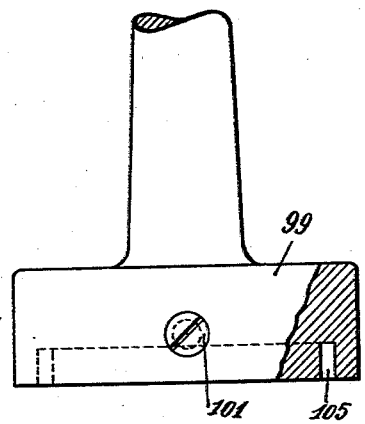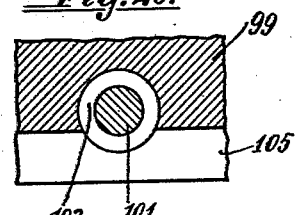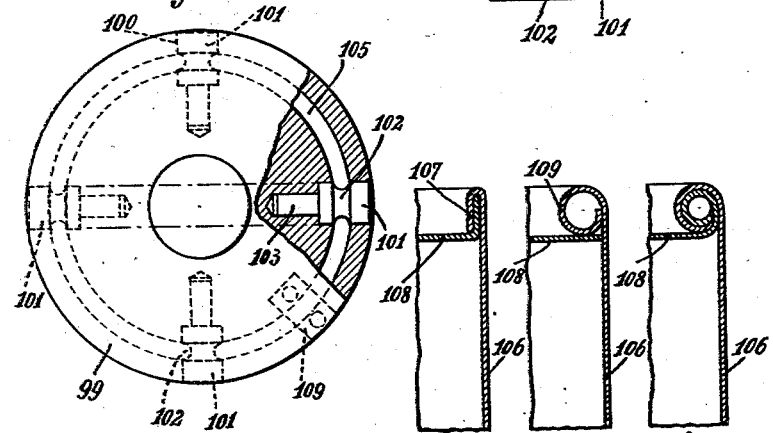

Patented Feb. 4, 1936

2,029,827

UNITED STATES PATENT OFFICE 2,029,827

MACHINE FOR CONTINUOUSLY INSERTING BOTTOMS AND LIDS IN FINISHED VESSEL WALLS OF PAPER, CARDBOARD, AND THE LIKE

Christian Majer, Tubingen, Germany

Application September 26, 1934, Serial No. 745,556
In Germany February 2, 1922

20 Claims. (Cl. 93—55)

Automatically operating machines for producing paper vessels are known, which produce and at the same time fit together the individual parts in a combination of different operations, the bottoms being drawn and at the same time pressed into the wall in the combined machine. This machine is open to the objection that, when an interruption occurs in any of the operations, all other operating devices are likewise rendered inoperative, and the whole machine is put out of service, so that the effective output of the positively combined machine is considerably reduced.

Plants are likewise known, which comprise different machines partly interconnected by conveying means, the bottoms and the lids being, however, separately drawn on a drawing press and then piled in the assembling machine and automatically taken from this pile. By this, partly separate construction, the danger of interruption existing in the first combined construction and particularly great when the cardboard bottoms are drawn from material of inferior quality is overcome by employing the pile for feeding the drawn bottoms. However, it has been found that the automatic picking up of the conically pressed bottoms from the pile likewise causes interruptions, because the conical bottoms, when piled, fit irregularly in one another. This is chiefly due to the fact that the drawn cardboard bottoms, after being stripped from the drawing ram, assume an oval shape in the longitudinal direction of the fibres of the roll of cardboard. Moreover, an operator is always required for building up the pile.

These objections are overcome by the machine according to the invention for inserting bottoms and lids in finished vessel walls made of paper, cardboard and the like, in that the lids and bottoms are fed directly from the drawing press to the assembling machine through guide channels. The drawing press runs at a slightly higher speed than the assembling machine, so that the bottoms and the lids produced in excess are piled separately in the long feed channels, and that, when, for example, a fresh roll of cardboard is inserted in the drawing press or an interruption occurs, the assembling machine can continue to work with the wall winding machine, using up the piled stock, so that only on rare occasions a stopping of the whole plant is necessary, because the piling up of the bottoms and lids is omitted and consequently they cannot possibly jam. This is of great importance, because the glued paper web in the wall winding machine will dry and result in a great loss in waste if the machine is stopped.

There is also the danger that the hollow bodies passing through the drying chamber dry too strongly and tear when the bottoms and lids are pressed therein, causing the vessels to leak.

For this reason the drying chamber is provided with a heat regulating device and a moisture gauge, so that the hollow bodies always have the requisite moisture content when the bottoms and lids are inserted.

In the plant a sterilizing arrangement is connected up behind the assembling machine, and heated to about 100° C. The finished paper vessels are sterilized in this sterilizing arrangement and fed to a known filling machine by a heated conveyor. The air heated for the sterilization is drawn off by a fan and blown into drying apparatus, in which the freshly wound sleeve-shaped walls are dried. The heated air from the sterilizer is also conducted into the feed channels for the bottoms and lids, so that a rational utilization of the heat is obtained.

The machine for pressing the bottoms and lids into the sleeve-shaped walls is provided with several operating points arranged one behind the other, for glueing the sleeve-shaped walls, feeding the bottoms and lids, pressing these into the walls, and so forth. The hollow bodies are successively fed to and removed from the working points at short intervals by a transverse and vertical feeding device. The finished vessels are conveyed by the machine through the sterilizer and thence to the filling machine. For each operation only one tool composed of two or more parts is employed for embracing or holding the sleeve-shaped vessels. The holding elements at the glueing point are shortened on both sides so that the hollow-body projects at least so far that, if no such body is fed, the holding element is not smeared by the glue applying member.

By constructing the machine and arranging the operating points in this manner only one tool is required for each operation, so that the cost of the machine is greatly reduced, whereas in the known revolver bottom inserting machines tools comprising six, eight or more parts are necessary for the single operation and, when producing vessels of different sizes the exchanging of the tools demands much time.

A machine for continuously inserting bottoms and lids in finished glued sleeve-like vessel walls made of paper, cardboard or the like, is illustrated by way of example in the accompanying drawings in which:—

Fig. 1 shows the machine plant in front elevation.

Fig. 2 is a top plan view of Fig. 1.

Fig. 3 shows the assembling machine in front elevation.

Fig. 4 is a top plan view of Fig. 3.

Fig. 4a shows a detail.

Fig. 5 is a side elevation of Fig. 3 seen from the right.

Fig. 6 is a part side elevation of Fig. 3 with conveyor frame laterally drawn out and lowered, with closed clamping jaws.

Fig. 7 is a similar view to Fig. 6 but with the jaws open.

Fig. 8 is a similar view to Fig. 6 but with the conveyor frame pushed forward and the jaws open.

Fig. 9 is a part front elevation of Fig. 8.

Fig. 10 shows the position of the link when the bottom and lid pressing rams are advanced.

Fig. 11 is a top plan view showing the operating points for beading in the bottoms and lids.

Figs. 12 to 15 show details on a larger scale.

Figs. 16 and 17 show a manner of fixing the lid and bottom.

Fig. 21 is a similar view to Fig. 20 showing the ram during the pressing in.

Fig. 22 shows a beading ram partly in elevation and partly in section.

Fig. 23 is an elevation of Fig. 22, partly in vertical section.

Fig. 24 is a bottom plan view of the ram partly in horizontal section.

Fig. 25 shows in cross section a bolt of the beading ram on a larger scale.

Figs. 26, 27 and 28 show three different types of beading.

Figure 18:
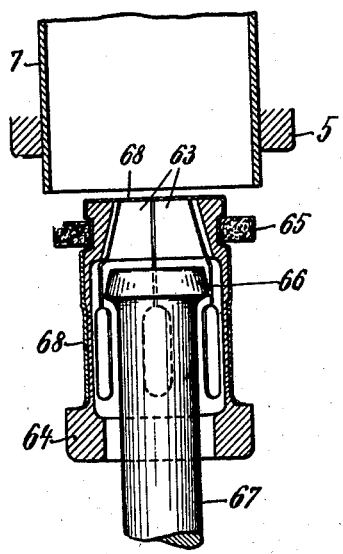
Fig. 18 shows in horizontal section a form of construction of a glueing device in inoperative position.

The machine aggregate comprises a winding machine 72 with drying apparatus 73, a bottom press 74, a lid press 75 and an assembling machine 76 connected with a sterilizer 77. The sleeve-shaped hollow bodies 7 wound on the machine 72 and which may be cylindrical or conical, are dried by means of hot air in the drying apparatus 73 connected with the machine 72. This hot air may be produced by means of electricity, gas or steam. From the drying apparatus the sleeve-shaped bodies are conveyed by a conveyor band 79 into the heated collecting channel 80 whence they are fed to the assembling machine 76, for pressing in the bottom or the lid. The bottoms 34, stamped out from a paper web and pressed to the desired shape by the machine 74, are automatically delivered to an elevator 82 or the like and raised thereby. The elevator 82 delivers the bottoms 34 into a heated collecting channel 38, through which they are conducted in front of the bottom pressing-in ram 84 of the assembling machine 76 and after being previously glued are pressed into the hollow bodies 7. The lids with closing device are produced in the machine 75. The finished pressed lids delivered by the press 75 are raised by means of an elevator 85 and discharged into a heated collecting channel 37. The channel 37 communicates with the machine and delivers the lids 34 in front of the ram 88 for pressing the lids into the hollow bodies 7, the bodies having been previously glued.

The machines 72, 76, 74 and 75 are interconnected and cooperate automatically so that, when the individual parts of the paper vessels have travelled along their prescribed paths, they are united on the assembling machine to form vessels ready for dispatch, which are then delivered from the aggregate.

The channels 80, 37 and 38 leading to the assembling machine are heated by hot air. The hot air is fed to the sterilizer 77 at a temperature of about 100° C. by means of a pipe 88. The hot air discharged from the sterilizer 77 is drawn by a fan through the pipe 89 into the drying apparatus 73 and conducted from the pipe 89 through pipes 90 into the channels 37 and 38. The pipes 90 may be connected with the channels 37 and 38 at any desired point.

The finished vessels 91 are conveyed by a conveyor band 92 from the sterilizer 77 to the filling machine.

The machine comprises a base frame 1 in which the axles necessary for the drive are journalled, a machine table 2 on which the lower halves 3 of the sleeve holders are adjustably mounted, a large vertically movable frame 4 with which the upper halves of the sleeve holders are adjustably connected and a conveying frame 6 extending transversely across the machine table for conveying the wound sleeve-shaped bodies 7 made of paper, cardboard or similar material. The frame 4 comprises guide rods 8, an upper connecting plate 9, and lower transverse connecting elements 10 and 11. The rods 8 are vertically guided in bearings 12 and 13 fixed on the frame 1. The movement of the frame 4 is effected by cams 15 fixed one on each end of the axle 14 and adapted, during their rotation, to raise and lower the frame at predetermined intervals. When the frame 4 is raised the hollow bodies 7 are advanced one operating step by the conveying frame 6, whereas, when the frame 4 is lowered, the hollow bodies 7 are held between the holder halves 3 and 5. Whilst the sleeves 7 are being held in the different working steps the glueing, pressing-in of the lids and bottoms and so forth, are carried out. The upper halves 5 of the sleeve holders are connected with the upper plate 9 by brackets 16, whereas the lower halves 3 of the sleeve holders are fixed on the machine table 2 or on the frame 1 by brackets 17. The brackets 16 and 17 are adjustable so that they can be set to the size of the hollow bodies. The two-part sleeve holders 3, 5 are arranged side by side at equal distances apart and can easily be removed from their brackets 16 and 17 and exchanged for dealing with hollow bodies 7 of another size. As many holders 3, 5 as there are operating points are usually provided in the machine. There may also be more holders 3, 5 than there are operating points. In this instance the holders 3, 5 which are not required can be disengaged or dismantled. In the transverse recess 18 of the table 2 the conveyor frame 6 is arranged between the lower sleeve holder halves 3 fixed on the table 2, guided with its two ends in transverse guides 19 (Figs. 3, 5, 7, 8, 9 and 10). The frame 6 has pins 20, 20 or the like engaging with the transverse guides 19, 19. These guides are adjustable on transverse pieces 10, 10 of the rods 8, 8, so that the frames 4 and 6 can be raised and lowered at the same time (Fig. 5). On the end of the axle 14 projecting at one side of the machine a cam drum 21 is keyed, which actuates a rocker lever 22 connected with the frame 6 by a link 23 (Figs. 5–8). The frame 6 is reciprocated periodically by the cam drum 21 and the lever 22. An up and down movement is also imparted by the frame 4 to the conveyor frame 6 at the end of its movement, so that the frame 6 carries out a rectangular movement, uniformly spaced recesses 24, 25, 26, 27, 28 and 29 are provided in the frame 6 in which the hollow bodies 7 rest whilst being conveyed from one operating point to another. The distances between the recesses 24 to 29 correspond to those of the holders 3, 5. The hollow bodies are moved on when the operations of the individual steps have been carried out and the frame 4 is raised with the holder-halves 5 (Fig. 7). During the ascent of the frame 4 the conveyor frame 6 is raised so far that the hollow bodies 7 are lifted out of the lower holder halves 3, whereupon the frame 6 with the hollow bodies 7 is shifted a distance 30 from one point of operation to the next (Fig. 5). At the end of this movement the frame 4 descends with the conveyor frame 6 so that the hollow bodies 7 moved through the distance of one operative point are placed in the next following holder halves 5. During the descent of the frame 4 the holders 3, 5 are at the same time closed and the hollow bodies held for the next operation. After the descent of the frame 6 it is returned into its initial position (Fig. 6). In this position the hollow bodies are placed by hand or automatically into the first recess 24 after each return movement of the frame 6. During each forward movement of the frame 6 the hollow bodies are moved on one operating point so that, when a hollow body has passed all the operating points, it is delivered finished into the last recess 29 in the frame 6.

In the drawings two methods of fixing the lids and bottoms 31 are illustrated. According to Figs. 12 to 15 the lid and the bottom are fixed in the hollow body by pressing and beading or folding in five separate operations. In the first operation the hollow body 7 is smeared by the glueing apparatus 32 with glue on its inner side at the ends 33 within the range of the lid. In the second operation the lid and bottom 31 are pressed into the hollow body (Fig. 12). In the remaining operations the edges 33 of the hollow bodies 7 are rigidly connected with the bottom by beading or folding (Figs. 13 to 15).

For beading a ram 99 may be employed having in its under face an annular groove 105 which serves for guiding the edge to be beaded. One or several radial bolts 101 are rotatably mounted and have extensions 103 which can be fixed by means of set screws 104. The bolts 101 have each a beading groove 102 adapted to the shape of the bead. The bolts 101 are mounted in the ram 99 in such a manner that the beading grooves 102 register with the annular groove 105. When the exposed portion of the beading groove 102 is worn, the bolt 101 is turned so that a fresh portion of the groove 102 registers with the groove 105 in the ram. If the whole of the groove 102 is worn out, the bolt 101 is renewed. The bolts 101 are made of high grade steel so that they will last as long as possible. According to Fig. 24 the two bolts 101 in the horizontal or vertical arrangement can be made in one piece. The number of bolts employed depends upon the size of the ram.

Other exchangeable elements can be inserted in the groove 105 of the ram instead of the bolts 101. Thus, for example, flat elements 109 can be inserted which have beading portions registering with the grove 105 (Fig. 24).

The lid flanges can at the same time be beaded into the sleeve edges with the beading ram (Figs. 26 and 28).

According to Figs. 16 and 17 the bottom and lid 34 are each provided with a conically drawn edge 35. These finished, previously pressed lids and bottoms 34 are pressed into the hollow bodies 7 by means of a correspondingly conical ram 36. The holders 3, 5 are provided with extensions at the operating points where the lid and bottom are pressed into the sleeves, the outer edges of these extensions being flush with the edges of the sleeves 7. These extensions have a bevel on the inner side corresponding to the conicity of the pressing ram 36 (Figs. 16 and 17). Thus, the originally cylindrical ends of the sleeves also become conical after the pressing in of the conical lid and bottom, this conical portion of their ends being limited by the bevel 60 in the extension 59. The extension 98 of the pressing-in ram 36 is resiliently mounted on one or both sides so that in the event of unequal length of the hollow body the extension 98 can yield and consequently the hollow body will not be crushed. Owing to the lids and bottoms being pressed under heavy pressure into the originally cylindrical ends of the hollow bodies 7, a strong stressing is produced which ensures an absolutely reliable closure between the lid and bottom and the wall of the hollow body, such as can only be attained by complicated beading in the case of cylindrically drawn bottoms. Moreover, the strength and stability of the vessel produced is increased by the conical ends.

The application of the glue, and also the remaining operations, is always carried out simultaneously on both sides of the hollow body. The finished pressed lids and the bottoms are automatically fed through the channels 37 and 38 in front of the pressing dies 36 which are exchangeably fixed in sliding members 39. These sliding members 39 are connected with pairs of toggle levers 40 the latter interconnected by levers 41 actuated by cams 42. The pressing-in of the lid and bottom into the hollow bodies 7 is effected by depressing the toggle levers 40 into their stretched position (Fig. 10). The glueing device 32 comprises an eccentric axle 43, which carries on its front end a glueing roller 44. The glue is applied on this roller 44 from the glue container by rollers 45, 46. During the application of the glue onto the inner side of the ends of the hollow body 7 the eccentric axles 43 are introduced from the side into the ends of the hollow body 7 so that they are in contact with the walls of the bodies, whereupon by rotating the axles 43 the rollers roll on the inner side of the hollow bodies and thus glue the ends thereof.

Figure 19:
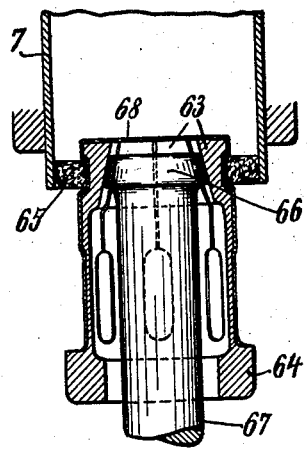
Fig. 19 is a similar view to Fig. 18 showing the glueing device in operative position.

The glueing device illustrated in Figs. 18 and 19 is more advantageous. According to this form of construction the glueing roller 65 is made of porous rubber or the like, onto the cylindrical outer surfaces of which the glue is applied from the glue container by means of rollers. The elastic glueing roller 65 is fixed on the end of a tubular member 64 which is rendered resilient by means of longitudinal slots. The front end 63 has the form of a hollow cone, into which the conical head 66 on the rod 67 is pressed. By pressing the head 66 into resilient tubular member 64 the radius of its front portion and consequently of the rollers 65 is enlarged. Fig. 18 shows the glueing device in inoperative position. The glueing roller 65 in its inoperative position is slightly smaller than the hollow body 7, so that the glue cannot be scraped off the roller when introducing the glueing ram into the hollow body 7. When it is desired to apply glue onto the inner side at the ends of the hollow body 7, the tubular member 64 is pushed into the hollow body 7 whereupon the head 66 of the rod 67 is pressed into the conically bored end 63 of the tubular member 64.

By forcing the conical head 66 into the tubular member 64 the front portion 63 of this member 64 will be enlarged, so that the elastic roller 65 bears against the inner wall of the hollow body 7. The tubular member 64 is then rotated, causing glue to be applied to the inner side of the ends of the hollow body 7. After the glueing the rod 67 is pulled back and the member 64 returned into its initial position shown in Fig. 18.

This operation is repeated every time a fresh hollow body 7 is brought to this working point.

Figure 20:
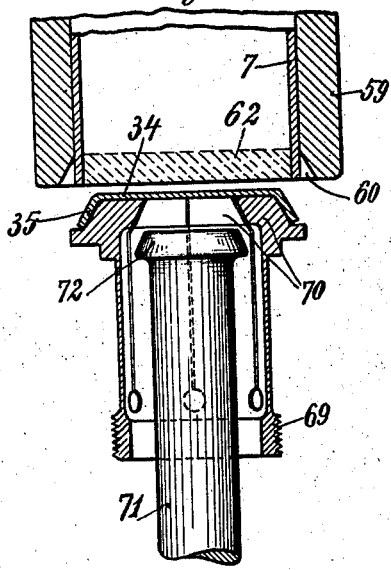
Fig. 20 is a horizontal section showing a form of construction of a pressing in ram in inoperative position.
Figure 21:
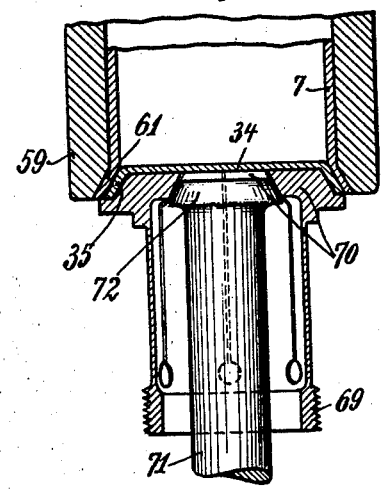

The tubular member 64 and the front aperture 63 are covered with a rubber cap so that no glue can penetrate into the member. The hollow body 7 is then fed to the pressing-in rams illustrated in Figs. 20 and 21, by means of which the conically pressed bottom and lid are pressed into the glued portion of the hollow body so that the ends of this body are likewise pressed conically outwards.

The ram 69 for pressing in the bottom also consists of a tubular member rendered resilient by longitudinal slots and the front end of which has a conical bore 70. As soon as the previously pressed lid 34 is placed onto the conical front end, the tubular member 69 is inserted into the end of the hollow body 7. By shifting the rod 71 its front conical end 72 is pressed into the bore 70 whereby the lid or bottom 34 is tightly pressed into the end of the hollow body 7. When the bottom or lid has been pressed into the hollow body 7, the rod 71 is pulled back, whereupon the front end of the tubular member 69 resiliently contracts and the tubular member can easily be moved back into the position shown in Fig. 20. This pressing ram prevents the glue applied to the inner surface of the sleeve, from being pushed inwards during the pressing in of the lid or bottom. The tubular member 64 of the glueing device and the tubular member 69 of the ram and also their rods 68 and 71 are mechanically actuated by the machine.

The holders 3, 5 are shortened on both ends at the glue applying points so that the hollow body projects freely at both ends, and when no hollow body is fed the holders are not smeared by the glue applying roller 44.

The machine is driven by the pulley 47, on the axle 48 of which a toothed wheel 49 is keyed which meshes with a toothed wheel 51 keyed on the axle 50. This axle 50 also carries another toothed wheel 52 which rotates the axle 14 through the intermediary of a toothed wheel 53. The toothed wheel 52 likewise drives a toothed wheel 55 on the axle 54 which actuates toggle levers 40 at one side of the machine, whereas the toothed wheel 53 by means of an intermediate toothed wheel 56 rotates a toothed wheel 57 keyed on an axle 58 which actuates the toggle levers 40 at the other side of the machine.

The machine operates in the following manner:—

It is assumed that the bottoms and lids are inserted as shown in Figs. 16 and 17. After the tools for the size of the hollow bodies 7 have been fitted and properly adjusted and a hollow body 7 has been placed in the first recess 24 of the conveyor frame 6, the machine is started, whereupon the frame 4 is raised with the conveyor frame 6. Owing to the raising of the frame 4 the holder halves 5 are lifted from the stationary holder halves 3 and opened. At the end of the upward movement of the frames 4 and 6 the frame 6 is shifted a distance 30 equal to the spacing of the holders. As soon as the frame 6 reaches its extreme advanced position, it is lowered with the frame 4. During the descent of the frame 6 the hollow body 7 is deposited in the first lower holder half 3. When the frames 4, 6 are lowered, the hollow body 7 is gripped by the holders 3, 5 and the glueing devices 32 become operative on both sides and the rollers 44 apply glue to the inner side of both ends of the hollow body 7. The pressing rams 36 are moved towards the hollow body 7 by the toggle levers 40 at the same time as the glueing device 32 is operated. When only one hollow body 7 has been fed the rams 36 run idle. Whilst the glueing devices 32 and the rams 35 are operating, the frame 6 in its lowered position is moved back by the lever 22. During the return movement of the frame 6 the operation of the glueing devices 32 are carried out. As soon as the frame 6 has been moved back, the second hollow body 7 is placed in the recess 24, whereupon the operation is repeated with the second hollow body 7. During this operation the first hollow body 7 is moved on another step to the pressing rams 36 by the frame 6.

During the third operation the first hollow body 7 is moved into the next operating point until the first hollow body has passed all the steps and is delivered into the last recess 29.

After the lid and bottom have been pressed into the hollow body the glue can draw and dry during the next operation.

Any desired number of operating points may be provided in the machine.

So that no lids and bottoms can pass from the channels 38 and 37 in front of the pressing rams when no hollow bodies 7 are on the frame 6, slides 96 are provided which close the ends of the channels 37 and 38.

The slides 96 are controlled by keys 93 the ends of which bear against the horizontal arms 94 of elbow levers 95. The upper ends of the elbow levers 95 are connected with the slides 96. The arms 94 of the elbow levers 95 are continually pulled against the lower ends of the keys 93 by springs 97.

The keys 93 are vertically guided in bars or the like. The upper ends of the keys bear against the hollow body 7. When there is no hollow body between the holders 3, 5 the keys move upwards and the levers 94, 95 swing under the influence of the springs 97 causing the slides 96 to close the channels 37, 38 (Fig. 4a).

I claim:—

1. A machine for continually inserting bottoms and lids in finished hollow bodies made of paper, cardboard and the like, comprising in combination drawing presses for said lids and bottoms, separate, heated drying channels leading one from each of said presses, an assembling machine at the other end of said drying channels, means for conveying said lids and bottoms separately through said channels to said assembling machine at an adjustable speed exceeding that of the assembling machine to store lids and bottoms in said channels for maintaining a feed of lids and bottoms to said assembling machine even in the case of interruption in the working of said lid and bottom drawing presses, a machine for winding the hollow bodies of paper, cardboard or the like, a drying chamber extending from said winding machine, a feed channel for the wound hollow bodies leading from said drying chamber to said assembling machine, means for separately conveying the wound hollow bodies from said winding machine through said drying chamber to said feeding channel connected to said assembling machine adapted to receive the finished vessels from said assembling machine, a heated conveyor adapted to deliver the sterilized vessels from said sterilizer to a known filling machine, a hot air pipe leading to said sterilizer, branch pipes leading from said sterilizers to said drying chamber and said drying channels, and a fan adapted to draw hot air through said hot air pipe into said sterilizer and force it through said branch pipes into said drying chamber and drying channels.

2. In a machine as specified in claim 1, hollow body holders each made of two halves, a conveying frame extending between said holder halves, and means for raising, shifting, lowering and returning said frame into its initial position to successively feed the hollow bodes into each of said holders at each cycle of movement and to receive a fresh hollow body at the end of each cycle of movement.

3. In a machine as specified in claim 1, holders one for each operating point of the assembling machine, each comprising at least two parts adapted to completely embrace and firmly hold a hollow body during the different operations and to allow the widening of the hollow body during the pressing in of the lids and bottoms.

4. In a machine as specified in claim 1, holders one for each operating point of the assembling machine, each holder comprising two halves and adjustably arranged at distances.

5. In a machine as specified in claim 1, holders one for each operating point of the assembling machine, each holder comprising two halves one half of each holder being stationary, a vertically shiftable frame carrying the other half of each of said holders, a vertically and horizontally shiftable frame between said holder halves adapted to receive the hollow bodies singly and to successively feed them to each of said holders, and means for vertically shifting said first mentioned frame to close said holder halves and grip the hollow bodies during each operation.

6. In a machine as specified in claim 1, holders one for each operating point of the assembling machine, each holder comprising two halves one half of each holder being stationary, a vertically shiftable frame carrying the other half of each of said holders, a vertically and horizontally shiftable frame between said holder halves adapted to receive the hollow bodies singly and to successively feed them to each of said holders, and independent driving and moving devices adapted to cause cooperation between said frames to successively feed the hollow bodies to said holders and close said holder halves.

7. In a machine as specified in claim 1, holders one for each operating point of the assembling machine, each holder comprising two halves one half of each holder being stationary, a vertically shiftable frame carrying the other half of each of said holders, a vertically and horizontally shiftable frame between said holder halves adapted to receive the hollow bodies singly and to successively feed them to each of said holders, means connecting said frames so that during the upward movement of said first mentioned frame said second frame is also lifted, and means for shifting said second frame when in raised position independently of said first mentioned frame.

8. In a machine as specified in claim 1, holders for the hollow bodies one for each operating point of the assembling machine, each holder comprising two halves, one half of each holder being stationary, a vertically shiftable frame carrying the other half of each of said holders, a vertically and horizontally shiftable frame between the two halves of said holders adapted to lift said hollow bodies from the bottom halves of said holders, convey them a distance equal to the distance between said holders and deposit them in the bottom halves of the next following holders, and means for approaching said holder halves to grip the hollow bodies after each displacement.

9. In a machine as specified in claim 1, holders for the hollow bodies one for each operating point of the assembling machine, each holder comprising two halves, one half of each holder being stationary, a vertically shiftable frame carrying the other half of each of said holders, a vertically and horizontally shiftable frame between the two halves of said holders and having uniformly spaced recesses corresponding to the distance between said holders, said vertically and horizontally shiftable frame adapted to lift the hollow bodies from the bottom halves of said holders without changing their mutual spacing, convey them a distance equal to the distance between said holders and deposit them in the bottom halves of the next following holders, and means for approaching said holder halves to grip the hollow bodies after each displacement.

10. In a machine as specified in claim 1, holders for the hollow bodies one for each point of operation in the assembling machine, and glueing and pressing devices arranged one on each side of the hollow bodies adapted to secure the lids and bottoms in said hollow bodies.

11. In a machine as specified in claim 1, two-part holders for the hollow bodies one for each operation in the assembling machine, glueing devices one on each side of at least one of said holders, and extensions on said holders, the extensions on the holders opposite said glueing devices being shorter than those of the remaining holders to allow the hollow bodies to project at both ends from these holders, to prevent smearing of the holders in the event of no hollow body being in the holders.

12. In a machine as specified in claim 1, two part holders for the hollow bodies one for each operation in the assembling machine, rams adapted to press the lids and bottoms into the ends of the hollow bodies held in said holders, and resilient extensions on said rams adapted to yield in the event of hollow bodies of irregular length to prevent the crushing of such hollow bodies.

13. In a machine as specified in claim 1, a glueing device in the assembling machine comprising in combination a glueing roller made of elastic material and of smaller diameter than the internal diameter of the hollow bodies, a sleeve provided with longitudinal slots at one end carrying said roller and having a conical bore at its end, a ram adapted to be pushed into said sleeve, and a conical head on the end of said ram adapted to engage in said bore and spread the end of said slotted sleeve to expand said roller to the size of the internal diameter of the hollow body.

14. In a machine as specified in claim 1, a glueing device in the assembling machine, comprising in combination a glueing roller made of elastic material and of smaller diameter than the internal diameter of the hollow bodies, a sleeve provided with longitudinal slots at one end carrying said roller and having a conical bore at its end, a ram adapted to be pushed into said sleeve, a conical head on the end of said ram adapted to engage in said bore and spread the end of said slotted sleeve to expand said roller to the size of the internal diameter of the hollow body, and a rubber cap on the slotted end of the sleeve and closing the bore in said sleeve.

15. In a machine as specified in claim 1, lid and bottom pressing-in devices in the assembling machine, each comprising in combination a hollow ram provided with longitudinal slots and a conical bore at its operative end, a rod extending into said ram, and a conical head on the end of said rod adapted to engage said conical bore to expand the slotted end of said ram to press outwards the ends of the hollow body.

16. In a machine as specified in claim 1, beading rams on the assembling machine adapted to bead the edges of the hollow bodies each of said rams comprising a lower part, and at least one beading element radially and exchangeably fitted in said lower part.

17. In a machine as specified in claim 1, beading rams on the assembling machine each comprising a lower part having an annular groove adapted to guide the edges of hollow bodies, and a plurality of bolts rotatably and fixably mounted in said lower part, each bolt having a beading groove extending around its periphery and registering with said annular groove and adapted to bead over the edges of the hollow bodies inserted in said annular groove.

18. In a machine as specified in claim 1, beading rams on the assembling machine each comprising a lower part having an annular groove adapted to guide the edges of hollow bodies, and a plurality of bolts rotatably and fixably mounted in said lower part, each bolt having a beading groove extending around its periphery and registering with said annular groove and adapted to bead over the edges of the hollow bodies inserted in said annular groove, said bolts adapted to be rotated through a part revolution when worn to bring a fresh portion of the beading groove into operative position.

19. In a machine as specified in claim 1, beading rams on the assembling machine each comprising a lower part having an annular guide groove for the edge of the hollow bodies, and a flat element inserted radially into said lower part and having beading portions registering with the annular guide groove in said lower part.

20. In a machine as specified in claim 1 slides at the delivery ends of the lid and bottom feed channels, elbow-levers connected to said slides, keys bearing against said levers and the hollow bodies in the assembling machine to cause said levers to swing said slides and liberate said channels when a hollow body is in the assembling machine, and springs connected to said levers and adapted to swing said levers to shift said slides and close said channels when no hollow body is in the assembling machine.

CHRISTIAN MAJER.